United States Patent [19]

Funk

[11] 3,757,042

[45] Sept. 4, 1973

[54] PAN AND TILT UNDERWATER OPTICAL VIEWING SYSTEM WITH ADJUSTABLE SOURCE-RECEIVER SEPARATION AND ZOOM LENSES

[75] Inventor: Clarence J. Funk, San Diego, Calif.

[73] Assignee: The United States of America as represented by the Secretary of the Navy, Washington, D.C.

[22] Filed: Feb. 18, 1972

[21] Appl. No.: 227,635

[52] U.S. Cl. ............. 178/7.2, 178/7.81, 178/DIG. 1
[51] Int. Cl. ............................................. H04n 7/18
[58] Field of Search ...................... 178/6.8, 7.81, 6.5, 178/7.89, DIG. 1, DIG. 30, 7.2, 7.92; 240/47, 62.54, 62.74; 356/1, 4, 5, 17

[56] References Cited

UNITED STATES PATENTS

| | | | |
|---|---|---|---|
| 2,244,687 | 6/1941 | Goldsmith et al. | 178/DIG. 30 |
| 3,239,601 | 3/1966 | Keys | 178/7.2 |
| 2,987,893 | 6/1961 | Robinson | 178/6.8 |
| 2,195,392 | 3/1940 | Van Alphen | 240/47 |
| 3,511,927 | 5/1970 | Lehr | 178/6.5 |
| 3,184,541 | 5/1965 | Foster et al. | 178/DIG. 1 |
| 2,278,916 | 4/1942 | Critoph et al. | 240/47 |

FOREIGN PATENTS OR APPLICATIONS

| | | | |
|---|---|---|---|
| 727,480 | 4/1955 | Great Britain | 178/DIG. 1 |
| 1,116,100 | 10/1961 | Germany | 178/DIG. 1 |

OTHER PUBLICATIONS

Allanson, Underwater Observation by Television, SMPTE, June 1956, Vol. 65, pp. 311–319.

*Primary Examiner*—Robert L. Griffin
*Assistant Examiner*—Joseph A. Orsino, Jr.
*Attorney*—Richard S. Sciascia

[57] ABSTRACT

An improved underwater, remotely-controlled camera is equipped with a coupled illumination system. The illumination system incorporates spaced light beam sources which are steered and focused to illuminate the field of view of the camera. Additionally, the light sources are equipped with polarization filters to polarize the light so as to cooperate with a similar device on the camera to eliminate backscattered light from particulate matter in suspension in the water between the camera and the object being viewed.

9 Claims, 11 Drawing Figures

PAN AND TILT UNDERWATER OPTICAL VIEWING SYSTEM WITH ADJUSTABLE SOURCE-RECEIVER SEPARATION AND ZOOM LENSES

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to an illumination system. More particularly, the invention pertains to an illumination system which is structurally and functionally combined with an optical instrument. In greater particularity, the invention pertains to an illumination system which provides illumination for an underwater camera. By way of further description of the field of invention, but not by limitation thereto, the invention is directed to an underwater illumination system for an underwater television camera equipped with remotely controlled focus and focal length optics and having pan and tilt control capabilities.

DESCRIPTION OF THE PRIOR ART

The use of closed circuit television cameras and other recording cameras in submarine vehicles is common in the prior art. Likewise, the mounting of illumination sources on the submarine vehicles has been common practice for some time. In general, both the cameras and illumination sources have been fixed in position with respect to the submarine vehicle.

As a result of these common practices, the quality of optical images obtained by the prior art arrangements were insufficient for many purposes. Among the difficulties encountered, is the problem of movement of the vehicle to obtain different views from the optical equipment. Movement of the vehicle stirs the water unnecessarily, increasing turbidity, thereby causing deterioration of the optical image.

Further, as will be understood by those familiar with photographic lighting, the illumination requirements for different subjects varies considerably in dependence on the particular subject. That is, some subjects photograph better with a light source close to the camera so as to produce a "flat" illumination of the subject. Such an illumination pattern is good for revealing such subtle color variations on a flat surface as might correspond to electrolysis of a ship's hull, for example. In other situations where texture or edge detail is required, as in the assessment of hull damage or crack location, an illumination pattern originating from the side is more desirable. The prior art devices do not readily permit the lighting to be varied to suit the different subject matter without recovery of the vehicle to make the desired adjustments.

Another difficulty often encountered in submarine photography is the control of the intensity of the illumination. Thus, when the camera is located at a relatively long distance, the prior art illumination sources disperse the light over a wide area, thereby reducing the intensity of the illumination falling on a small area of interest within the illuminated field.

Still another problem encountered in photographic activities in underwater environments involves a deterioration of the optical image due to reflection of the illuminature light from small particles suspended in the water. This reflection, termed "backscatter" in the art, degrades the contrast of the image in a similar fashion to flare-produced loss of contrast in terrestial photography. Again, the movement of the supporting vehicle aggrevates this turbidity and further limits the usefullness of the prior art submersible mounted camera systems.

SUMMARY OF THE INVENTION

The system of the invention mounts a television or other camera on a submersible vehicle with high intensity light sources located symmetrically with respect to said camera on either side thereof. The individual light sources are mounted upon extensible arms such that the separation between the camera and the individual light sources may be selectively altered. A control system provides for simultaneous pan and tilt movements of a camera and each of the individual light sources. Further, each light source is provided with an optical system to adjust the divergent angle of the beam of light supplied thereby. A control system is provided to change the angle of divergence of the illumination sources in synchronism with the change of viewing angle of the camera. Each light source is provided with a circular polarizing means such that the individual light sources emit a beam of circularly polarized light. Further, the underwater photographic system of the invention comprises a circular analyzer selectively insertable in the optical path of the camera.

STATEMENT OF THE OBJECTS OF THE INVENTION

It is an object of this invention to provide an improved underwater photography system.

A further object of this invention is to provide an improved underwater closed circuit television photographic system.

Another object of this invention is to provide an improved underwater photographic system having a plurality of relatively displaceable illumination sources.

Another object of this invention is to provide an underwater photographic system having light sources displaceable from the camera.

A still further object of this invention is to provide an underwater photographic system having a plurality of illumination sources which synchronously pan and tilt so as to follow the motion of the camera.

Still another object of this invention is to provide an underwater television system employing circularly polarized light.

Yet another object of this invention is to provide an underwater closed circuit television system having proven, remotely operated controls.

These and other objects of the invention will become more readily apparent from the ensuing specification when taken with the drawings.

DESCRIPTION OF THE PREFERRED EMBODIMENT

Figure 1:
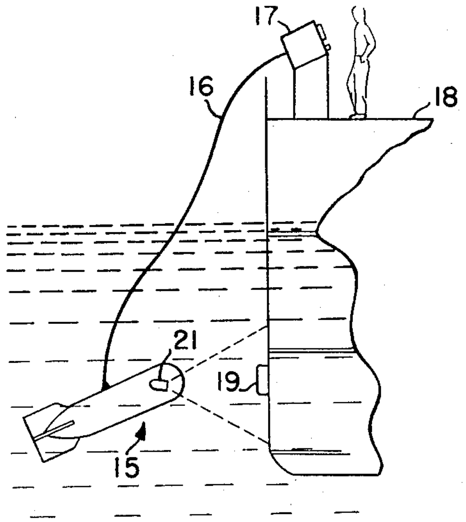
FIG. 1 is a partial section view of the device of the invention being used to inspect the hull of a ship by personnel onboard the ship.

Referring to FIG. 1, a submersible vehicle 15 is shown attached, via tether 16, to control console 17. As shown, control console 17 rests on deck 18 of the ship employing the device. An object 19, attached to the hull of the ship is being inspected by the photographic optic system of the invention shown at 21.

Figure 2:
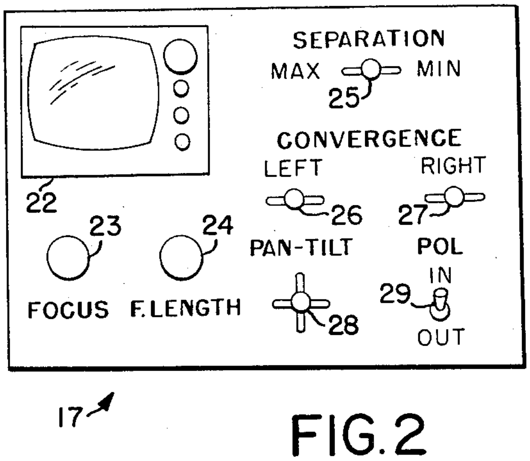
FIG. 2 is a front elevation view of the control panel of the system of the invention.

Referring to FIG. 2, the control console portion of the invention is shown in front elevational view. For purposes of simplicity, only those controls pertaining to the photographic-optical system of the invention are shown. However, it should be understood that the control system for submersible vehicle 15 may also be conveniently located on console 17. In the upper left hand portion of control console 17, a television receiver 22 is positioned. Television receiver 22 may be of any conventional type adapted for closed circuit coaxial line input. A variety of such receivers which may be successfully adapted to the device of the invention are well known in the art and therefore no further description thereof is deemed warranted. Below television receiver 22 are focus control 23 and focal length control 24. Adjacent to television receiver 22, and at the upper portion of control console 17, a separation control 25 is located. Separation control 25 is connected to extensible supports for control thereof in a manner to be described.

Below separation control 25 suitably convergence controls 26 and 27, which control the convergence on the left and right illumination units, are located. The operation of these controls will be explained more fully. Below the left convergence control 26 the pan tilt control 28 is located and below the right convergence control 27, the polarization control switch 29 is located. The function of these controls will be more completely set forth subsequently.

Figure 3:
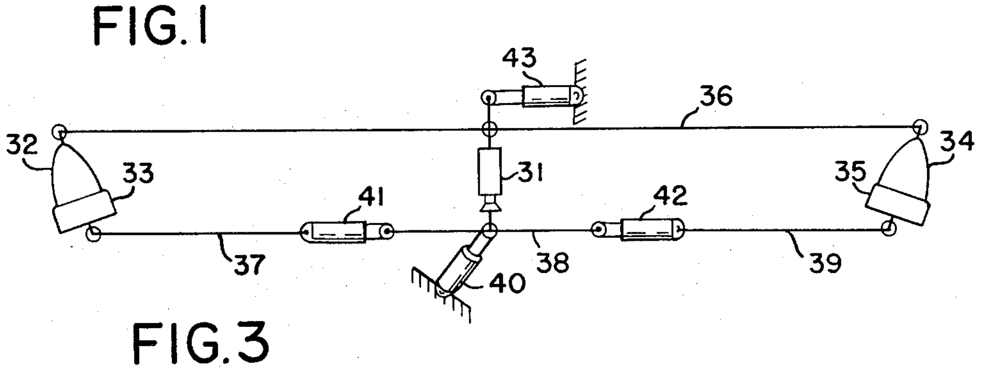
FIG. 3 is a schematic diagram showing a mechanical linkage system according to the invention.

Referring now to FIG. 3, a simplified schematical view of a system according to the invention will be described. A camera 31, which for purposes of illustration may be considered a closed-circuit TV camera, is shown in cooperation with light sources 32 and 34. The left light source 32 employs a light source optical system 33 and, similarly, right light source 34 employs a light source optical unit 35. These optics will be described in greater detail herein. Camera 31 and light source 32 and 34 are coplanarly mounted on a trapezohedral linkage. The trapezohedral linkage comprises a rear strut 36, a left strut 37, a central strut 38 and a right strut 39 connected with suitable pivoting linkages to camera 31 and light sources 32 and 34. The entire linkage may be made to tilt about the longitudinal axis of rear strut 36 by a suitable drive 40. Center strut 38 is connected to left strut 37 and right strut 39 by means of convergence drives 41 and 42 respectively. For purposes of illustration, convergence drives 41 and 42 are shown as hydraulic cylinders which effectively control the convergence angle of light sources 32 and 33 by changing the forward length of the trapezohedral linkage comprised by struts 37, 38 and 39.

As will be apparent to those familiar with the photographic arts, the system of FIG. 3 is capable of tilting and panning movements with the light sources 32 and 34 tracking the movements of camera 31 so as to illuminate the field of view thereof. The term panning, of course, refers to the angular displacement of a camera about an internal point such as to simulate the movements of a viewer turning his head from side to side without vertical movement. In the system shown, this panning movement is obtained with a pan and drive unit 43 which is connected to camera 31 by suitable linkage. As may be readily perceived, light sources 32 and 34 may be set at such an angle as to converge their illumination beams on a target in front of camera 31. As camera 31 pans to the left, light source 32 will be swung in a more forward direction while light source 34 will be swung to the left in a more oblique angle to illuminate subject uniformly.

The point at which the convergence of two light beams occurs may be controlled by convergent drive units 41 and 42.

The present state of control technology permits motor drives 41 and 42 to be simultaneously driven in cooperation with the focus control of camera 31 such that the beams from light sources 32 and 34 converge in the zone of focus of camera 31. Likewise, for extreme pan angles or for special effects, convergence drives 41 and 42 may be independently controlled so as to change the angles of light sources 32 and 34 with respect to camera 31.

Tilt control may be provided for the aforedescribed system by either synchronously tilting light sources 32 and 34 and camera 31, or alternatively, the single tilt drive means 40, shown schematically in FIG. 3, may tilt the entire trapezoheral linkage.

Figure 4:
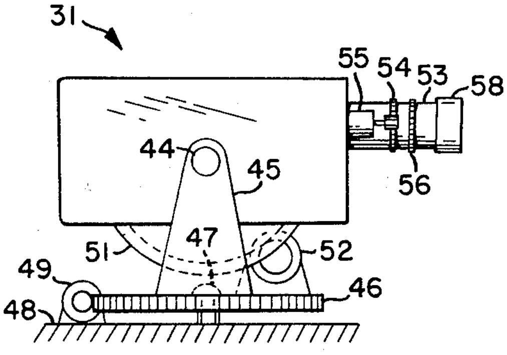
FIG. 4 is a side elevation view showing the mounting arrangement for the television camera.

Referring now to FIG. 4, an alternative tilt and pan drive arrangement will be illustrated. As shown, camera 31 is pivoted about a pivot axle 44 extending from the sides thereof. It will be observed that pivot axle 44 is slightly rearward and downwardly situated from the image plane location of the normal camera lens. This position corresponds roughly to the pivot point of the human neck with relation to the retinal plane of the average human. Such a spacial relation, although not critical for all applications, permit the tilt and pan drives to be controlled by the head movements of the operator of the camera if desired.

As shown, camera 31 is supported on pivot axle 44 by suitably dimensioned and placed upright pivot supports 45. In turn, pivot supports 45 are rigidly attached to a gear wheel 46. A support axle 47 extends vertically from a fixed base 48 to rotably support gear wheel 46. A pan drive motor 49 is also mounted on fixed base 48 and drivingly engages gear wheel 46. Drive motor 49, like the other rotary drive motors to be described herein, may be either of the fluid actuated or electric type. It will also be noted that, for purposes of clarity of illustration, the conventional power connections to the drive motors have been omitted.

The tilt gear segment 51 is rigidly mounted on camera 31 and extends downwardly from the bottom thereof between pivot supports 45. A rotary tilt drive motor 52 drivingly engages tilt gear 51 to cause camera 31 to rotate about pivot axles 45. This rotation, of course, produces the desired tilt motion in camera 31.

Figure 5:
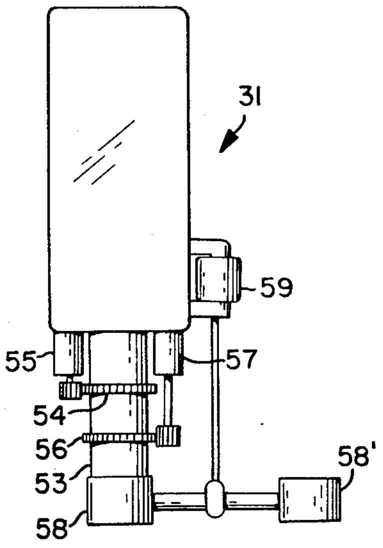
FIG. 5 is a top elevational view showing the drive mechanism for the optical controls of the television camera.

Referring now to FIG. 5, a top elevation view of camera 31, discloses a lens 53 mounted on the forward end thereof. Lens 53 is on the variable focal length type and has a focus gear 54 to change the focal distance thereof. Gear 54 is drivingly engaged by a rotary focus drive 55 mounted on the front of camera 31. Likewise, the focal length of lens 53 is changed by a suitable gear 56 which, in turn, is drivingly engaged by a focal length drive motor 57. It may be seen that, by appropriate energization of motors 55 and 57, both the focal length and the plane of focus of lens 53 may be selectively altered.

A polarizer 58 is selectively positioned in front of lens 53 and is selectively removed from its place in the optical path of lens 53 by suitable support means which is driven by a polarizer drive motor 59. If desired, polarizer 58 may be replaced with other optical elements shown genrally at 58'. For purposes of explanation of the incident invention, element 58' may be simply a lens shade or a neutral density filter having the approximate light loss of polarizer 58. Similarly, although only two elements, polarizer 58 and optical element 58' are shown, a greater number may be used in actuality. For example, in developmental models of the invention as many as five elements have been contained in a rotary wheel which is selectively indexed by drive 59.

From the foregoing, it may be seen relatively complete camera functions are possible for camera 31 to obtain focus changes, focal length changes, pan changes, and tilt changes in response to selected control functions from control console 17. When this arrangement is used in the system of FIG. 3, relatively complete photographic examination of underwater objects may be obtained. However, the system of FIG. 3 remains somewhat limited in the type of lighting falling on the subject. The shortcoming of the system is overcome by a further development of the invention.

Figures 6, 7, 8:
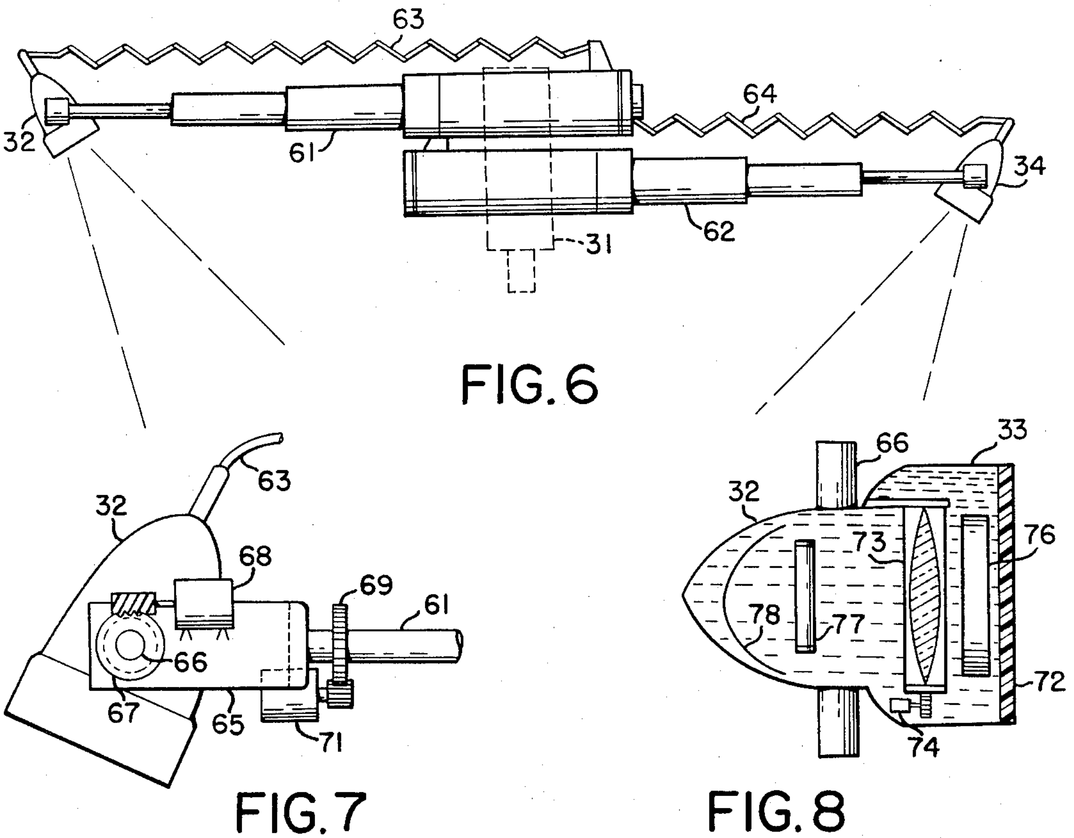
FIG. 6 is a top elevational view showing a single light source and a suitable mounting arrangement.
FIG. 7 is a top elevational view of one of the light sources used with the invention showing suitable tilt and pan driving arrangements.
FIG. 8 is a sectional view through one of the illumination units used in the invention showing a suitable internal arrangement.

Referring now to FIG. 6, an alternative support mechanism for light sources 32 and 34 will be described. As shown, light sources 32 and 34 are mounted at the outboard ends of the oppositely facing, three-stage hydraulic cylinders 61 and 62. Of course, the hydraulic cylinders are symmetrically disposed with respect to camera 31 indicated by broken lines. It will be noted that light sources 32 and 34 are connected to an appropriate power distribution point by suitable coil electrical conduits 63 and 64 respectively. For purposes of clearity, the operational details of camera 31 have been omitted from FIG. 6.

Those versed in the art will readily see that hydraulic cylinders 61 and 62 are subject to the same degree of control as convergence drive cylinders 41 and 42 of FIG. 3. However, unlike convergence drives 41 and 42, hydraulic cylinders 61 and 62 change the physical displacement of light sources 32 and 34 with respect to camera 31 rather than alter their angular relationship. This adjustability of separation provides great photographic lighting flexibility as well as convenience in launching and recovering submersible vehicle 15. These and other advantages made possible by this arrangement will be described in greater detail herein.

Referring now to FIG. 7, a drive system for light sources 32 and 34 providing both convergent and pan drive as well as tilt will be described. For purposes of simplicity, only the drive for light source 32 will be described. However, it should be understood that the drive for light source 34 is substantially identical to that used for 32. As shown, a suitably shaped yoke 65 is rotably mounted on the extensible end of hydraulic cylinder 61. An axle 66 which is attached to light unit 32 is rotably engaged in the outer ends of yoke 65. A gear 67 is attached to axle 66 and is drivingly engaged by motor 68. Of course, motor 68 is fixedly mounted on yoke 65. Thus, it may be seen, that motor 68 can drive light unit 32 about axle 66 so as to control both the convergence and panning motions thereof.

Just inboard of yoke 65 on the extensible end of hydraulic cylinder 61, a gear 69 is fixedly attached. A suitable motor 71 is attached to the yoke 65 and drivingly engages gear 69. It may be seen, the operation of motor 71 causes yoke 65 to rotate about the extensible end of the hydraulic cylinder 61 in such a direction as to cause the illumination from light source 32 to move upwardly and downwardly in tilt.

For purposes of simplicity, the driving connections for motors 68 and 71 are omitted. It should be understood that like motors 49 and 52, motors 68 and 71 may be either hydraulic or electric. Since a wide variety of motors capable of performing the aforedescribed drives are known in the art, no further description thereof is necessary for the complete understanding of the instant invention.

Referring to FIG. 8, a longitudinal section through light source 32 will now be described. At the outer end, light source optics unit 33 is closed by a transparent lens 72. Behind lens 72, a suitable optical unit 73 is disposed. Optical unit 73 may be moved by an optical unit drive motor 74. A variety of mounting arrangements are possible for optical unit 73. For example, a helically mounted thread arrangement is commonly used such that rotation of drive motor 74 causes the optical unit 73 to rotate on its optical axis and be moved outwardly or inwardly, depending upon the sense of rotation of motor 74. Before optical unit 73, a polarizer 76 is positioned. This polarizer is preferably of the circular polarization type and, although a variety of units are known in the art, those having a high transmission are preferred for this application. Behind optical unit 73 and polarizer 76, a light source 77 is mounted. Any suitable light source may be used for that shown at 77, however, a halogen vapor type lamp has proven very satisfactory in developmental models. Behind light source 77 a reflector 78 is positioned. Some models of light source lamps 77 have reflectors incorporated therein, and, if this type is used, reflector 78 may be dispensed with.

It should be noted that the light source 32 is preferably filled in its entirety with an optically transparent oil to promote cooling and promote more nearly neutral buoyancy for the assembled unit.

Figure 9:
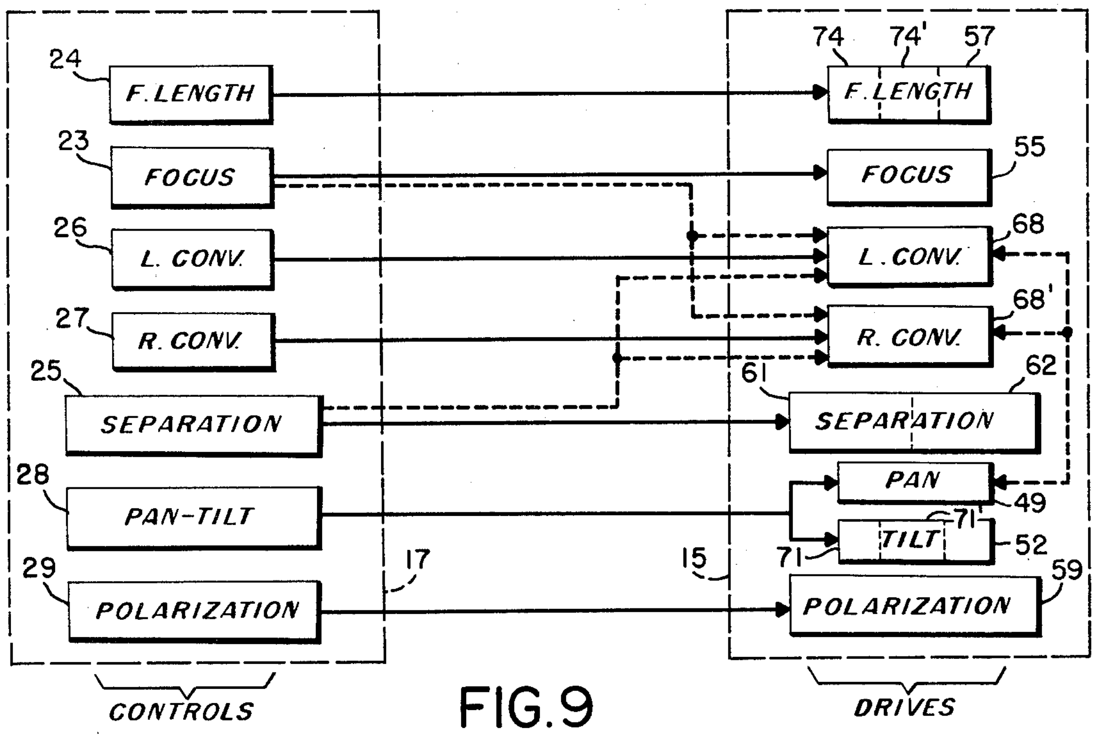
FIG. 9 is a diagramatic drawing of the control connections used with the system of the invention.

Referring to FIG. 9, the control mechanism of the invention is shown in a diagramatic arrangement. The controls, described in connection with FIG. 2 are shown in console 17, on the left, while the controlled drive means, previously described in connection with FIGS. 3–8, are shown on the right as being located in submersible vehicle 15. As may be seen, focal length control 24 controls the focal length drive motor 57 of the camera and the drive motors 74 and 74' in light sources 32 and 34 respectively. As indicated by the solid line, focus control 23 is connected to the focus drive 55. Also, a secondary control function from focus control 23 may be used to drive the convergence drives 68 and 68' on light sources 32 and 34 respectively. In this manner, the convergence of the light sources as controlled so as to illuminate the area in the zone of focus of camera 31. As previously noted, the left convergence control 26 and right convergence control 27 are connected to their respective convergence drive units 41 and 42 in the mechanical species or 68 and 68' on light sources 32 and 34 respectively. Similarly, separation control 25 is connected to the telescopic hydraulic cylinders 61 and 62 by means of a direct control link. If desired, a secondary control link as indicated by the broken lines may be used to alter the convergence drives 68 and 68' to keep their illumination outputs convergent on the same zone of focus as the separation between the two light sources is altered. These secondary control links, as well as the other illustrated secondary control links may comprise conventional electronic or fluidic systems in dependence on the types of drives to be controlled.

The pan-tilt control 28, which is a two way type control, is connected into the pan drive motor 49 as well as the tilt motor 52 on the camera 31 and to tilt and drive motors 71 and 71' on light sources 32 and 34 respectively. As indicated by the broken line connection, the pan and tilt control may also exercise a secondary control function on the convergence drive 68 and 68'. This secondary control, of course, is effective to cause light sources 32 and 34 to track the zone of focus of camera 31 as camera 31 is panned.

Polarization control 29, as illustrated, is connected to polarization drive 59 so as to place polarizer 58 in front of the camera lens 53 or, alternatively, optical unit 58'. It will be recognized by those versed in the art that should more polarization filters or different optical units be desired to be placed in front of lens 53, the polarization control 29 may be of a different type than that illustrated in FIG. 2. However, such modifications are obvious to those skilled in the control arts and need not be further described.

Likewise, as suggested earlier, the control links themselves indicated by the solid lines, as well as the secondary control functions indicated by the broken lines, in FIG. 9 may be either hydraulic or electrical in dependence upon the particular type of drive utilized in the equipment. For example, if hydraulic motors are used to perform the pan,tilt, focal length and focus changes as well as the convergence changes the secondary controls may be any of a known type of fluid control which provide the desired proportioning. However, if electrical controlled mechanisms are used, similarly well known electrical proportional controls may be utilized to provide the secondary control functions. Because the control functions themselves are straightforward and do not contribute directly to the improved optical and mechanical arrangement of the invention, they are not described in greater detail herein.

Figure 10:
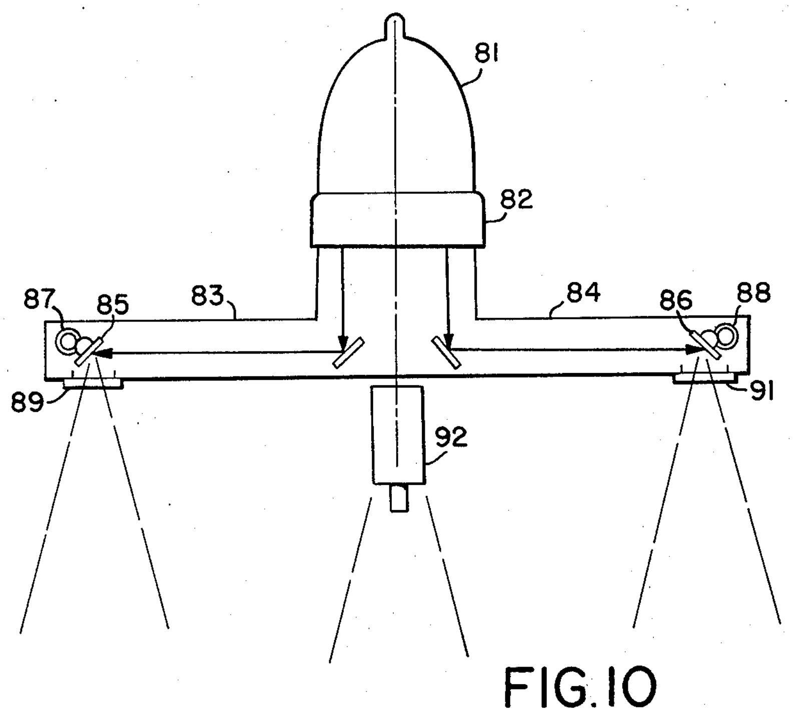
FIG. 10 is a diagramatic view of an alternative system according to the invention utilizing but a single light source.

Referring to FIG. 10, a system according to the invention is shown which employs but a single light source and single camera. This system is particularly advantageous where a particular type of light source 81 is expensive, as in the case of laser sources, or where a more compact system is desirable. The optical unit 82 contains a beam splitter which divides the illumination output of light source 81 into two paths which are sent down periscopes 83 and 84.

Periscopes 83 and 84 may be varied in length to control the separation of the exit bundles of light much in the same way that hydraulic cylinders 61 and 62 are controlled in the device of FIG. 6. Such periscope control is well understood in the submarine vehicle and optical instrumentation fields. At the outermost ends of periscopes 83 and 84 pivotal reflector 85 and 86 are located. Drive motors 87 and 88 drivingly engage pivotal mirrors 85 and 86 to control the convergence and panning of the exiting light bundles. The outer ends of periscopes 83 and 84 are closed by suitable transparent lenses 89 and 91 such as to permit their length to be filled with the same type of transparent cooling oil as used within light source 81.

Of course, camera 94 is centrally located between the exit ends of periscopes 83 and 84 and may have the same type of drive and remote control arrangements as those used with camera 31, described above.

Figure 11:
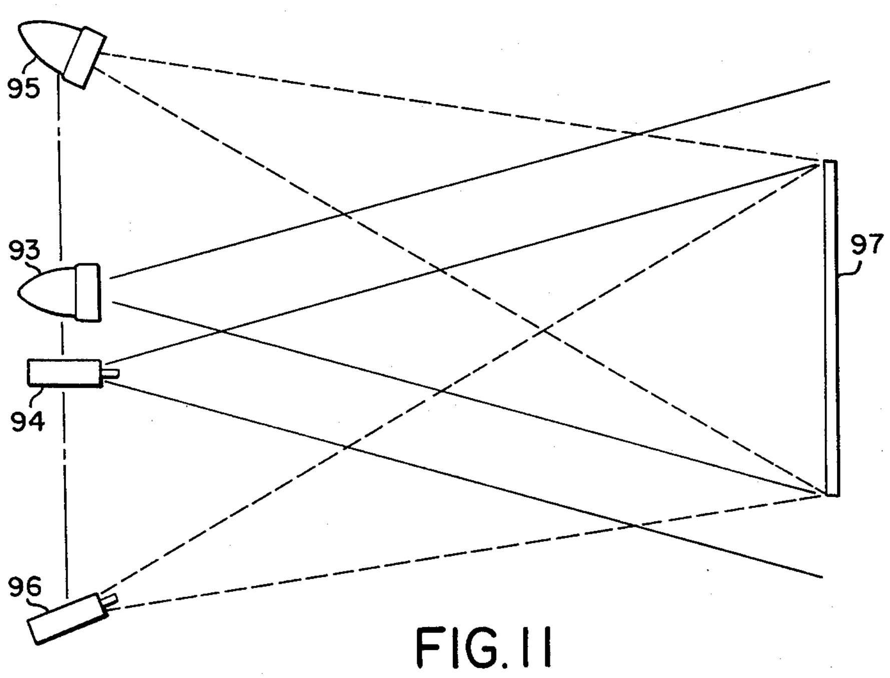
FIG. 11 is a schematic view of another alternative arrangement of the system of the invention.

Referring now to FIG. 11, another arrangement of light sources and cameras which may be used with the system of the invention is illustrated. As shown, a single light source 93 and camera 94 are centrally located. Symmetrically separated with respect to this central location, a second light source 95 and a second camera 96 are located. As may be readily perceived, light source 95 and camera 96 may be operated from the remote ends of telescopic hydraulic cylinders 61 and 62 while light source 93 and camera 94 occupy the central position therebetween. Such an arrangement has the advantage of obtaining both flat lighting and more contrasting cross lighting without moving cylinders 61 or 62. Of course, two television receivers or a suitable switching means is required to utilize this arrangement of the invention.

Other arrangements may suggest themselves to those versed in the art wherein well known equivalents are substituted for their corresponding members in the system of the invention. For example, in the device shown in FIG. 10, bundles of optic fibers may be used to replace periscopes 83 and 84. In the device of FIG. 6, a mechanical carriage and circularly driven lag drive screws may be used to replace hydraulic cylinders 61 and 62. Similarly, drive mechanisms may be incorporated to remove polarizers 76 from the individual light units in the same fashion that polarizer 58 is placed in front of camera lens 53.

MODE OF OPERATION

The mode of operation of the system of the invention is straightforward and, in general, comprises the normal manipulation of the controls shown on console 17 in FIG. 2 which are coupled to the aforedescribed drives in the fashion illustrated in the schematic representation of FIG. 9. Thus, submarine vehicle is launched and maneuvered by remote controls through tether 16 to a desired position beneath the surface of the water. The optical system is then energized and control 23 is varied until the target such as 19, shown in FIG. 1, is centered in the zone of sharp focus. Then, by using separation control 25 and convergence controls 26 and 27 the positions of light sources 32 and 34 may be adjusted to provide the desired amount of contrast for the particular object being viewed. If the water is turbid and backscattering is prevalent, then a polarizer may be placed in front of the camera lens by use of control 29. If it is desired to view a greater object than can be taken in with the fixed position of submersible vehicle 15 then the pan and tilt control 28 may be used to move the field of view about the area under investigation. Similarly, if an object appears but is too small or too large an object size to gain the desired information, focal length control 24 may be adjusted to cause lens 53 to have the desired focal length to obtain an image of object 19 having the desired size.

When closed circuit television cameras are used, the image appearing on the screen of television camera 22 provides an instant reference for operational controls. Further, the extreme versatility of the system of the invention permits a wide variety of applications other than those disclosed herein.

The foregoing description taken together with the appended claims constitutes a disclosure such as to enable a person skilled in the optics and oceanographic arts and having the benefit of the teachings contained therein to make and use the invention. Further, the structure herein described meets the aforestated objects of invention, and generally constitutes a meritorious advance in the art unobvious to such a skilled worker not having the benefit of the teachings contained herein.

Obviously, many modifications and variations of the present invention are possible in the light of the above teachings, and, it is therefore understood that within the scope of the disclosed inventive concept, the invention may be practiced otherwise than specifically described.

What is claimed is:

1. An optical instrumentation system for applications in an underwater environment comprising in combination:

a submersible vehicle capable of attaining and maintaining a desired position in the underwater environment;

camera means mounted on said submersible vehicle for receiving and recording time related images of objects located within the underwater environment in the vicinity of said submersible vehicle;

light source means for providing an illuminating light beam to impinge selected areas adjacent said submersible vehicle;

variable length support means connected between said light source means, said camera means, and mounted to said submersible vehicle for selectively varying the effective lateral separation between said light source means and said camera means;

support drive means effectively connected to said variable length support means to selectively and laterally extend or retract the variable length support means for altering the optical and spatial relationship between said camera means and said light source means; and pan and tilt drive means operatively connected to said camera means and said light source means for simultaneously and selectively altering the direction of aim of said camera means and said light source means with respect to said submersible vehicle.

2. An optical instrumentation system according to claim 1 further including:

a variable focal length lens mounted on said camera means and in the optical path thereof for altering the angle of view acceptance of said camera means;

variable optical means mounted on said light source means in the optical path thereof for determining the angular beam width of the illuminating light beam; and drive means operatively connected to said variable focal length lens means and to said variable optical means for selectively and simultaneously adjusting the angle of view acceptance of said camera means and the angular width of the illuminating beam.

3. An optical instrumentation system according to claim 1 further including:

circular polarizer means connected to said light source means and disposed in the optical path thereof for circularly polarizing the illuminating light beam; and a circular polarizer connected to said camera means and selectively insertable into the optical path thereof, whereby light backscattered from particulate matter in the underwater environment will be excluded from the camera means.

4. An optical instrumentation system according to claim 1 further including convergence drive means connected to said light source means for altering the angular displacement thereof with respect to said variable length support means, whereby the illuminating beam may be angularly directed independent of the movement provided by said pan and tilt drive means and connected to the focus control of said camera means for alteration of the angle between the light source means in response to the focus adjustment of the camera means whereby the illuminated area is maintained as the area photographed by the camera means.

5. An optical instrumentation system according to claim 1 further including transparent cooling oil means within said light source means for conducting the heat to the surrounding water and having a density which is chosen to cooperate with the structure of said light source means to cause the structure to have approximate neutral buoyancy.

6. An optical instrumentation system according to claim 1 which:

said camera means includes a television camera having a circular polarizer in the optical path thereof;

said light source means includes two sources of circularly polarized light; and said variable length support means includes two telescoping supports each of which is connected between one of said polarized light sources and said submersible vehicle for varying the separation between said light sources, whereby the angle of incidence of the object illumination may be varied by control of said telescoping supports and said circular polarizer minimizes image degrading backscatter to thereby produce an optimum image of a submerged object.

7. An optical instrumentation system according to claim 1 wherein said light source means includes: a plurality of reflectors adjustably mounted on the extensible ends of said variable length support means for intercepting and directing the illuminating right beam; and reflector drive means connected to said reflectors for movement thereof to an adjusted position to converge the illuminating light beam on the objects located in the underwater environment.

8. An optical instrumentation system for applications in an underwater environment comprising in combination:

a submersible vehicle capable of attaining and maintaining a desired position in the underwater environment;

two closed circuit television cameras having circularly polarizing filters in the optical paths thereof and mounted on said submersible vehicle for receiving and recording time related images of objects in the vicinity of said submersible vehicle;

two sources of circularly polarized light for providing illuminating light beams to impinge selected areas adjacent said submersible vehicle;

variable length support means connected to said closed circuit television cameras and to said light sources to support one light source and one camera in a non-displaceable position with respect to the aforesaid submersible vehicle and to support the other camera and light source on two oppositely displaceable ends of the variable length support means for oppositely directed adjustable support thereof with respect to the aforesaid submersible vehicle; and pan and tilt drive means operatively connected to said displaceable and said displaceable light source means for simultaneously selectively altering the direction of aim of said displaceable camera and said displaceable light source with respect to said submersible vehicle, whereby one camera produces a flatly illuminated image while the other camera produces a cross illuminated image of a common object.

9. An optical instrumentation system according to claim 8 wherein said non-displaceable camera includes a variable focal length lens.

* * * * *